United States Patent
Wilfret et al.

[15] 3,656,367
[45] Apr. 18, 1972

[54] SAFETY STEERING FOR MOTOR VEHICLES

[72] Inventors: Karl Wilfret, Gerlingen-Waldstadt; Bela Barenyi, Maichingen Wurttemberg, both of Germany

[73] Assignee: Daimler-Benz Aktiengesellschaft, Stuttgart-Unterturkheim, Germany

[22] Filed: Jan. 23, 1970

[21] Appl. No.: 5,288

[30] Foreign Application Priority Data

Jan. 23, 1969 Germany .................. P 19 03 255.4

[52] U.S. Cl. .................................................. 74/492
[51] Int. Cl. .................................................. B62d 1/18
[58] Field of Search .................................. 74/492, 493

[56] References Cited

UNITED STATES PATENTS 3,475,984  11/1969  Ward ............................. 74/492
3,505,897  4/1970  Scheffler et al. ................. 74/492

FOREIGN PATENTS OR APPLICATIONS 737,959  10/1955  Great Britain .................... 74/492

Primary Examiner—Milton Kaufman
Attorney—Craig, Antonelli & Hill

[57] ABSTRACT

A safety steering for motor vehicles in which the steering spindle together with the outer steering column is able to pivot about a vehicle cross-axis under the influence of a force that exceeds the force acting on the steering wheel during normal operation; a plastically deformable deformation member is secured at the lower end of the outer column which in case of an impact of the driver against the steering wheel, is extended by the steering spindle projecting out of the outer column.

10 Claims, 3 Drawing Figures

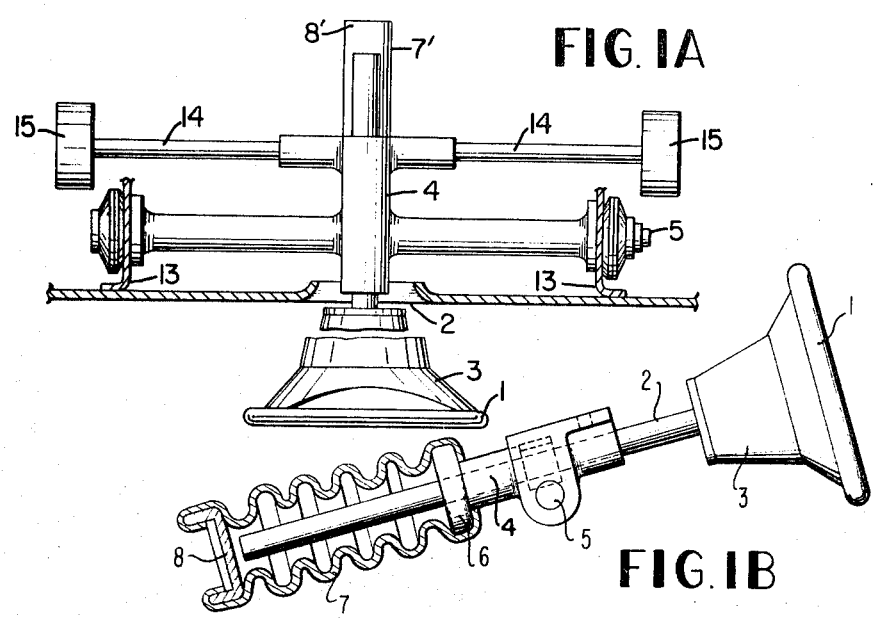
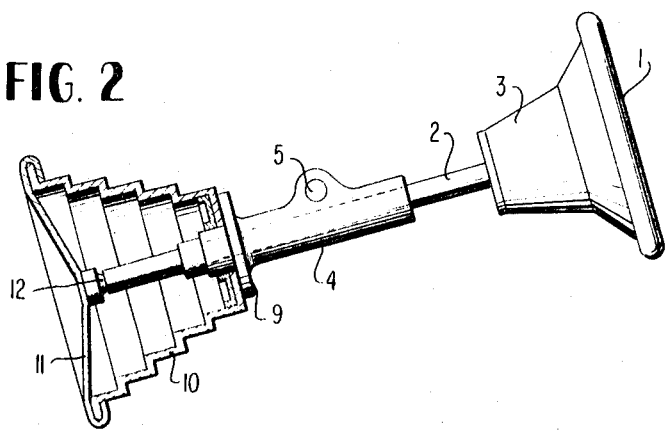

SAFETY STEERING FOR MOTOR VEHICLES

The present invention relates to a safety steering system for motor vehicles, especially with non-rigid transmission members between steering spindle and wheels, in which the steering wheel or a part carrying the steering wheel is so secured at the vehicle super-structure that under the influence of a force which exceeds the force acting on the steering wheel during normal operation, a pivoting or deflecting of the steering wheel about a vehicle cross-axis may take place, as disclosed in the copending U.S. Pat. application Ser. No. 880,104, filed on Nov. 26, 1969, in the name of Karl Wilfert et al, and entitled SAFETY STEERING FOR MOTOR VEHICLES, and assigned to the assignee of the present application.

It is known in the prior art to arrange between the steering wheel and the upper end of the steering spindle of motor vehicles plastically yielding deformation members which serve for the protection of the driver in case of an impact against the steering wheel caused by accidents. With a non-guided deformation member arranged in such a manner, it is, however, not always possible for space reasons to achieve the necessary deformation paths.

It is already known from the German Pat. No. 1,126,749 to enable sufficient deformation paths in that a further deformation member is arranged between a fixed part of the vehicle superstructure and the lower end of the steering spindle.

For a steering system according to the aforementioned copending patent application, however, a deformation member according to the German Pat. No. 1,126,749 is not suitable because, with a pivoted or deflected steering wheel, it would no longer be acted upon in the axial direction by the steering spindle and therefore, also would not be compressed in a controlled manner.

Starting with this state of the art, a steering system of the type described in the aforementioned copending application is therefore proposed in which according to the present invention a conventionally plastically deformable deformation member is secured at the lower end of the outer column of the steering system pivotal together with the steering wheel, which deformation member during the impact of the driver against the steering wheel is stretched or extended by the steering spindle projecting out of the outer column.

Particularly advantageous types of construction of the present invention can be readily ascertained from the following description, the drawing and the claims.

Accordingly, it is an object of the present invention to provide a safety steering for motor vehicles which avoids by simple means the shortcomings and drawbacks encountered heretofore.

Another object of the present invention resides in a safety steering for motor vehicles which assures a sufficient deformation path even with a non-guided deformation member.

A further object of the present invention resides in a safety steering for motor vehicles which enables a pivoting of the steering wheel about the vehicle cross-axis under application of a force on the steering wheel exceeding the force under normal operation and which assures reliable operation of the deformation member even when the steering wheel has thus been pivoted.

These and further objects, features and advantages of the present invention will become more obvious from the following description when taken in connection with the accompanying drawing which shows, for purposes of illustration only, two embodiments in accordance with the present invention, and wherein:

FIG. 1A is a schematic elevational view, partly in cross-section, showing the safety steering arrangement of the present invention.

FIG. 1B is a side view, partly in cross-section of a first embodiment of a safety steering in accordance with the present invention provided with a deformation member of undulated shape, and FIG. 2 is a partial elevational view, partly in cross-section, through a second embodiment of a safety steering in accordance with the present invention provided with a deformation member offset in a step-shaped manner.

Referring now to the drawing wherein like reference numerals are used throughout the views to designate like parts, and more particularly to the basic arrangement shown in FIG. 1A, a conventional deformation member 3 of any suitable construction is arranged between the steering wheel 1 and the upper end of the steering spindle 2. The outer column 4 of the steering is so secured at the vehicle superstructure 13 that it is pivotal about a shaft or pin 5 under the influence of a predetermined force. A deformation member 7' is secured at the lower end of the outer column 4 which is closed off by a bottom part 8', against which the lower end of the steering spindle 2 is able to support itself or abut in case of an accident and is thereby able to extend or lengthen the deformation member 7. Non-rigid transmitting means 14 are provided between the spindle 2 and the wheels 15 of the vehicle. The transmission of the steering movements takes place in a conventional manner not illustrated in detail, for example, by way of a pinion and rack.

In the embodiment illustrated in FIG. 1B the guided deformation member 7 has an undulated, tubularly shaped configuration. This deformation member 7 is secured by way of a flange 6 at the lower end of the outer column 4. A bottom part 8 is provided for abutting with the end of the steering spindle 2 and thereby extending or lengthening the deformation member 7.

In the embodiment illustrated in FIG. 2 a guided deformation member 10 of step-shaped, offset configuration is secured at the lower end of the outer column 4 by way of a flange 9; the lower end of the steering spindle 2 is supported by way of a ball 12 at the bottom part 11 of the deformation member 10. Also, in this embodiment, in case of an impact of the driver against the steering wheel 1 caused by an accident, a compressing and/or tilting of the unguided deformation member 3 and a stretching or extending of the guided deformation member 10 is possible by the force transmitted to the steering spindle 2.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are within the scope of those skilled in the art.

What is claimed is:

1. A safety steering system for motor vehicles comprising a steering wheel spindle, a steering wheel attached to the spindle, a column for supporting the steering wheel spindle secured to a portion of the vehicle superstructure by pivot means such that a pivoting of the steering wheel about the pivot means is possible under the influence of a force which exceeds the force acting on the steering wheel during normal operation, and a plastically deformable deformation means secured at the lower end of the column, said deformation means being pivotal together with the steering wheel, the steering spindle projecting out of the column such that said deformation means is extended in case of impact of the driver against the steering wheel by abutment of the steering spindle with a portion of the deformation means.

2. A safety steering system according to claim 1, characterized by non-rigid transmitting means between the steering spindle and the wheels of the vehicle.

3. A safety steering system according to claim 1, said deformation means including a ball supporting the steering spindle at its lower end.

4. A safety steering system according to claim 1, characterized in that the deformation means is constructed in the form of an undulated tube.

5. A safety steering system according to claim 1, characterized in that the deformation means is constructed offset in a substantially step-shaped manner.

6. A safety steering system according to claim 1, characterized in that a further deformation means is arranged between the upper end of the steering spindle and the steering wheel.

7. A safety steering system according to claim 6, characterized in that said further deformation means is an unguided deformation member.

8. A safety steering system according to claim 7, said deformation means including a ball supporting the steering spindle at its lower end.

9. A safety steering system according to claim 7, characterized in that the deformation means is constructed in the form of an undulated tube.

10. A safety steering system according to claim 7, characterized in that the deformation means is constructed offset in a substantially step-shaped manner.

* * * * *

UNITED STATES PATENT OFFICE
CERTIFICATE OF CORRECTION

Patent No. 3,656,367            Dated      April 18, 1972

Inventor(s) Karl Wilfert and Bela Barenyi

It is certified that error appears in the above-identified patent and that said Letters Patent are hereby corrected as shown below:

Title page, line 2, which now reads:

"Wilfret et al"

should read as follows:

-- Wilfert et al --.

Line 5, which now reads:

"[72] Inventors: Karl Wilfret, Gerlingen-Waldstadt; Bela should read as follows:

-- [72] Inventors: Karl Wilfert, Gerlingen-Waldstadt; Bela

Signed and sealed this 10th day of October 1972.

(SEAL)
Attest:

EDWARD M. FLETCHER, JR.          ROBERT GOTTSCHALK
Attesting Officer                  Commissioner of Patents